United States Patent
Illikkal et al.

(10) Patent No.: US 8,458,711 B2
(45) Date of Patent: Jun. 4, 2013

(54) QUALITY OF SERVICE IMPLEMENTATION FOR PLATFORM RESOURCES

(75) Inventors: Ramesh G. Illikkal, Portland, OR (US); Ravishankar R. Iyer, Portland, OR (US); Leena K. Puthiyedath, Beaverton, OR (US); Donald K. Newell, Portland, OR (US); Li Zhao, Beaverton, OR (US); Srihari Makineni, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1744 days.

(21) Appl. No.: 11/527,222

(22) Filed: Sep. 25, 2006

(65) Prior Publication Data

US 2008/0075101 A1 Mar. 27, 2008

(51) Int. Cl.
*G06F 9/46* (2006.01)

(52) U.S. Cl.
USPC ............ 718/103; 718/100; 718/102; 718/104

(58) Field of Classification Search
USPC .......................... 718/103, 100, 101, 102, 104
See application file for complete search history.

(56) References Cited

U.S. PATENT DOCUMENTS

| 5,592,671 | A | * | 1/1997 | Hirayama | 718/104 |
|---|---|---|---|---|---|
| 5,828,653 | A | * | 10/1998 | Goss | 370/230 |
| 6,816,456 | B1 | | 11/2004 | Tse-Au | |
| 6,859,926 | B1 | | 2/2005 | Brenner et al. | |
| 6,959,335 | B1 | | 10/2005 | Hayball | |
| 6,990,593 | B2 | | 1/2006 | Nakagawa | |
| 7,080,377 | B2 | * | 7/2006 | Peled et al. | 718/102 |
| 7,095,754 | B2 | | 8/2006 | Benveniste | |
| 7,120,715 | B2 | * | 10/2006 | Chauvel et al. | 710/244 |
| 7,162,540 | B2 | * | 1/2007 | Jasen et al. | 709/242 |
| 8,205,023 | B1 | * | 6/2012 | Rhoades | 710/43 |
| 2002/0019879 | A1 | * | 2/2002 | Jasen et al. | 709/240 |
| 2002/0023118 | A1 | | 2/2002 | Peled et al. | |
| 2002/0065867 | A1 | * | 5/2002 | Chauvel | 709/104 |
| 2002/0143843 | A1 | | 10/2002 | Mehta | |
| 2004/0117790 | A1 | | 6/2004 | Rhine | |
| 2008/0235487 | A1 | * | 9/2008 | Illikkal et al. | 711/207 |

FOREIGN PATENT DOCUMENTS

WO 2008/039426 5/2008

OTHER PUBLICATIONS

International Search Report and Written Opinion for PCT matter PCT/US2007/020621 dated Mar. 19, 2008; 10 pages.
International Preliminary Report on Patentability received for PCT Application No. PCT/US2007/020621, mailed on Apr. 9, 2009, 6 pages.
IA-32 Intel® Architecture Software Developer's Manual; vol. 3A: System Programming Guide, Part 1; pp. 8-36 to 8-38. Intel Corporation, Jun. 2006.

* cited by examiner

*Primary Examiner* — Emerson Puente
*Assistant Examiner* — Willy W Huaracha
(74) *Attorney, Agent, or Firm* — Derek J. Reynolds (57) ABSTRACT

A method, computer readable medium, and system are disclosed. In one embodiment, the method comprises setting a quality of service (QoS) priority level value for one or more computer system platform resources, other than a central processor core, relating to a task running on the computer system, and determining whether the one or more computer system platform resources will be allocated to the task based on the QoS priority level setting.

8 Claims, 7 Drawing Sheets

Current CR8 and TPR

FIG. 4

New CR8 and TPR

QUALITY OF SERVICE IMPLEMENTATION FOR PLATFORM RESOURCES

FIELD OF THE INVENTION

The invention relates to the quality of service of platform resources.

BACKGROUND OF THE INVENTION

As multi-core multi-threaded processors become commonplace, there is a strong desire in the computer industry for allowing the operating system and applications to have better control over the resources available in the platform. As more cores and computing power are added to computer platforms, the rest of the platform resources, which are shared across the applications running on these cores, need to be well managed to create a balanced system. Today, the level of differentiation of computer system services provided to applications running on a central processor is limited to the processor core using the Task Priority Register (TPR). As application software goes through different task priority levels, this register is set by the software to mark the current priority level of the processor. This information is used to avoid the processor being interrupted by lower priority events.

The processor hardware ensures the priority enforcement inside the core and is essentially a mechanism to manage the available compute resources. But when it comes to resources outside of the core, currently there is no mechanism for the software to communicate service level requirements to potential platform level Quality of Service (QoS) mechanisms. This lack of fine grain management of the processor and platform resources may be exacerbated as more virtualization technologies are implemented, and computer users consolidate their servers by running multiple disparate applications on the same machine. To address this, QoS mechanisms outside the processor core are being developed at the component as well as at the platform level to provide ways for better management of the available resources. But without proper mechanisms to expose these capabilities to the OS and applications, full potential of platform QoS may not be realized.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a method, system, and computer readable medium to implement quality of service priority level controls for platform resources are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
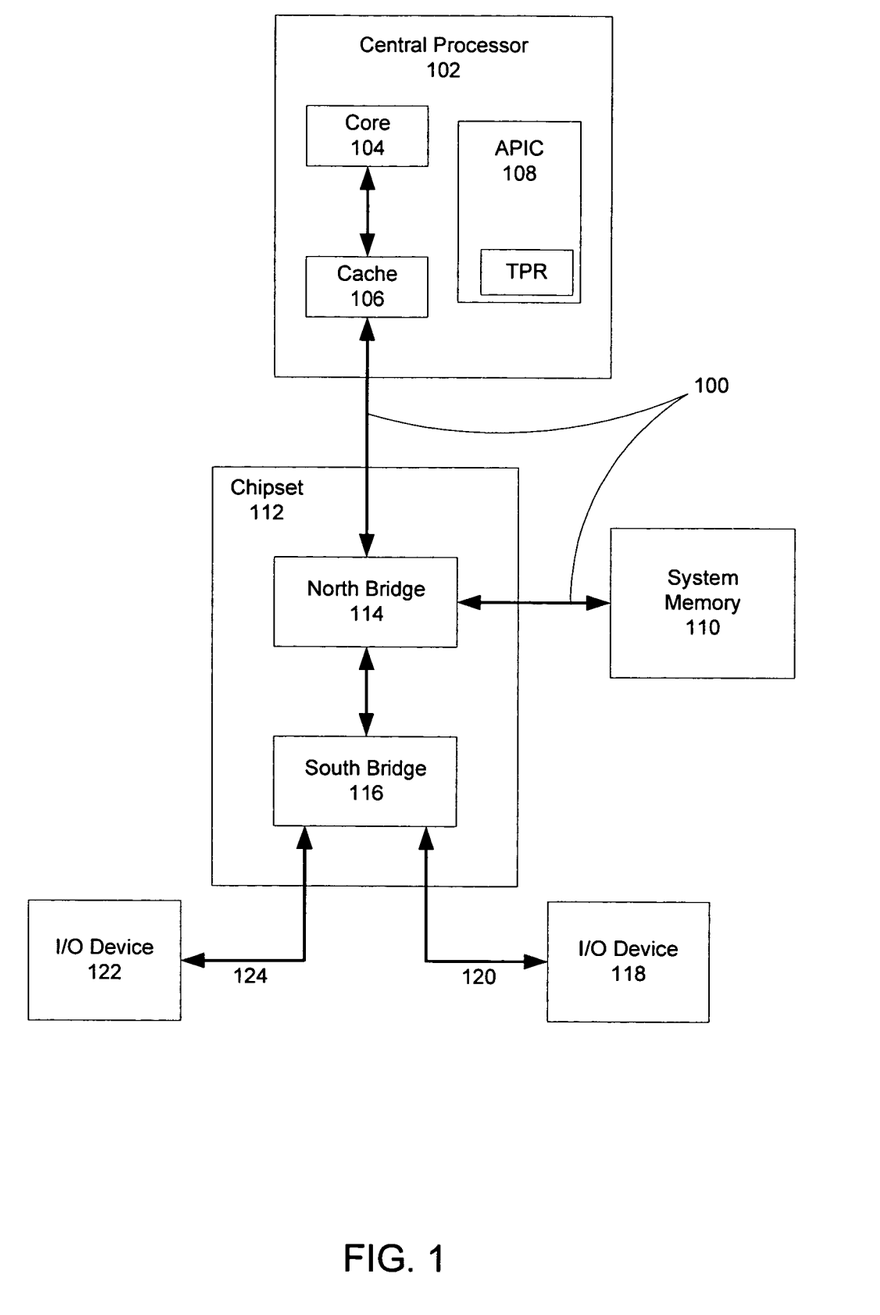
FIG. 1 is a block diagram of a computer system which may be used with embodiments of the present invention.

FIG. 1 is a block diagram of a computer system which may be used with embodiments of the present invention. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 may be coupled to processor-memory interconnect 100. In another embodiment, there may be multiple central processors coupled to processor-memory interconnect (multiple processors are not shown in this figure).

In one embodiment, central processor 102 has a single core 104. In another embodiment, central processor 102 has multiple cores (multiple cores are not shown in this figure). The core 104 is coupled to a cache memory 106 that also resides in the central processor 102. Additionally, central processor 102 may include an advanced programmable interrupt controller (APIC) 108. The APIC 108 has a number of control registers (CR) and other processor specific registers. In one embodiment the Task Priority Register (TPR) is a register located within APIC 108.

Processor-memory interconnect 100 provides the central processor 102 and other devices access to the system memory 110. A system memory controller controls access to the system memory 110. In one embodiment, the system memory controller is located within the north bridge 114 of a chipset 112 that is coupled to processor-memory interconnect 100. In another embodiment, a system memory controller is located on the same chip as central processor 102. Information, instructions, and other data may be stored in system memory 110 for use by central processor 102 as well as many other potential devices. I/O devices, such as I/O devices 118 and 122, are coupled to the south bridge 116 of the chipset 112 through one or more I/O interconnects 120 and 124.

In one embodiment, a software application running on the central processor 102 may have a priority level that determines its execution importance relative to any other software applications. The priority level gives a software application a specified priority in being executed on the central processor 102. In different embodiments, there may be one, two, four, or many priority levels. In one embodiment, the central processor 102 may be set to only run programs that are at a certain priority level more frequently than programs with a lower priority. Also if a central processor 102 is set to run software applications at a certain priority level, any external interrupts that are at a lower priority level will not be allowed to interrupt the current execution.

A software application running on the central processor 102 may run many tasks. In one embodiment, a task is a certain portion of the execution of a software application. Each task within an application may be designated with a certain priority level. The software application can set the TPR to mark the current priority level of the central processor core. Setting the processor's TPR with a specific priority level value tells the central processor 102 to block interrupts of lower priority. This can determine the interruptability of the tasks executing on the central processor 102.

Different software applications being executed by the central processor 102, as well as different tasks executed within each application, require different amounts and types of resources from the computer system platform. For example, one task may be memory storage intensive, another may be processor-memory interconnect bandwidth intensive, another may be input/output (I/O) intensive, and yet another may be central processing unit (CPU) cache intensive. It is generally beneficial to allocate these different platform resources according to the need of the task running on the computer system. Thus, in one embodiment, the computer system shown in FIG. 1 allows assigning independent priority levels to the cache, interconnect, memory, I/O, and power resources within the system. The ability to prioritize these resources is in addition to the prioritization of the CPU core running the task.

In one embodiment, the computer system in FIG. 1 has a process by which software applications running on the computer system can communicate the priority requirement of the application to the platform regarding resources such as memory, I/O, interconnects, processor cache, and system power. In one embodiment, a platform priority register (PQR—Platform QoS Register) is defined and is utilized similarly to the TPR. In this embodiment, software running on the processor sets the PQR with values representing the platform priority requirement of the currently running task in regard to platform resources. In different embodiments, the software may set the PQR to prioritize system memory, I/O, the processor-memory interconnect, the processor's cache, the platform power delivery system, or a combination of two or more of those resources. In another embodiment, the availability of additional platform resources, apart from those listed, are also being manipulated by the PQR.

The software application's memory and I/O accesses going outside of the processor core are then tagged with priority class information based on the current PQR value. QoS enforcement mechanisms in the platform use this priority tag to allocate platform resources appropriate for this request. In different embodiments, the platform QoS enforcement mechanisms may include logic at the resource that can read the tagged QoS information from the memory and I/O accesses and adjust the resource's interaction with the access accordingly, the platform QoS enforcement mechanisms may also include software logic in the operating system that can adjust resource utilization based on tagged QoS information, or any other resource utilization adjustment logic that can be implemented on the platform. In one embodiment, the tag information may include specific bits that are added to the memory/IO access that can be utilized by the QoS logic to determine the priority level of the specific access.

Figure 2:
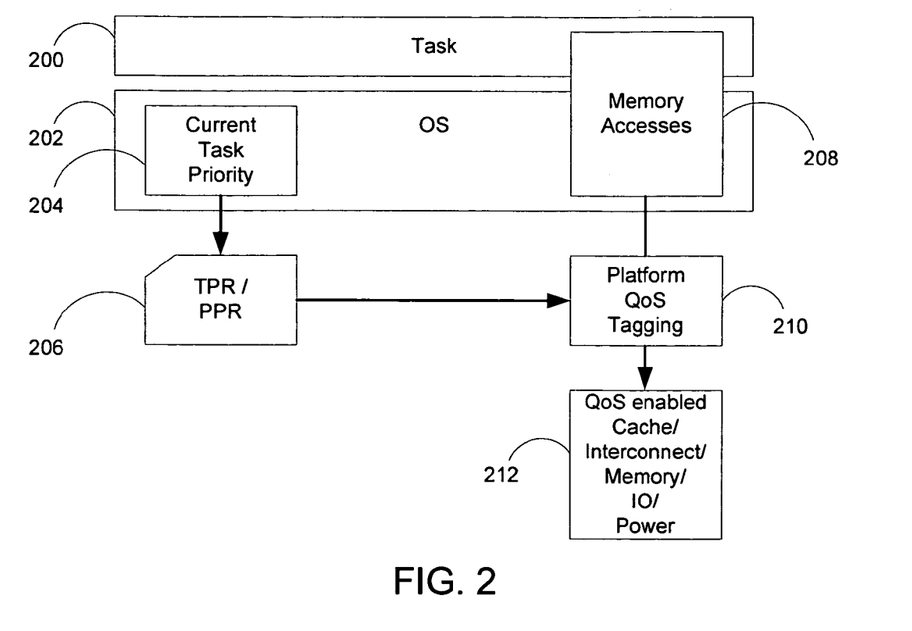
FIG. 2 describes one embodiment of a platform-level QoS mechanism on a platform that utilizes the existing TPR to set platform resource priority levels.

FIG. 2 describes one embodiment of a platform-level QoS mechanism on a platform that utilizes the existing TPR to set platform resource priority levels. In this embodiment, the existing TPR is used transparently to provide platform service differentiation on top of its current job to provide processor core service differentiation. In this embodiment, a software application has a task 200 running on the computer system. The task interacts with the operating system 202 by providing the operating system with the current task priority level 204. The operating system 202 takes the current task priority level and feeds it into the TPR 206. As the task 200 runs, it results in system memory accesses 208.

The accesses are tagged through a platform QoS tagging procedure 210 with the current value of the TPR. The platform QoS tagging procedure 210 adds QoS information, received from the TPR, to the memory or I/O access transaction. Thus, the memory/IO access has additional priority level information accompanying it equal to the TPR that the processor is running at. If the TPR specifies the priority level for the current task is high for the processor, then the platform QoS tagging procedure 210 adds a high priority tag to a memory access outside of the core. Therefore, the memory/IO access outside the core would be given high priority by any platform QoS enabled resource such as the cache, the processor-memory interconnect, the system memory, the I/O, or platform power delivery. In one embodiment, the priority levels may be low, medium, and high. In this embodiment, if the priority level is high in the TPR, it requires that the process also gets high priority treatment from the platform.

In another embodiment, Control Register 8 (CR8) is utilized to save the priority level for platform QoS resources. CR8 is utilized within Intel® Corporation's 64-bit extensions of the IA-32 architecture. The tagged memory/IO accesses are then received by one or more QoS enabled resources 212, and those resources can modify their interaction with the memory/IO accesses accordingly. A QoS enabled resource can read the priority level in the tag information and determine which memory/IO access should be given priority. For example, if one memory/IO access is tagged "high" priority, it receives preference from the QoS enabled resource over another memory/IO access that is tagged "medium" priority.

This process of tagging memory/IO accesses with the current value of the TPR allows for the platform resources to be given the same priority level as the processor core. While this allows for high priority tasks to be given high priority across the platform, it does not allow for differentiation of priority levels among the different platform resources as well as differentiation from the processor core priority level.

Figure 3:
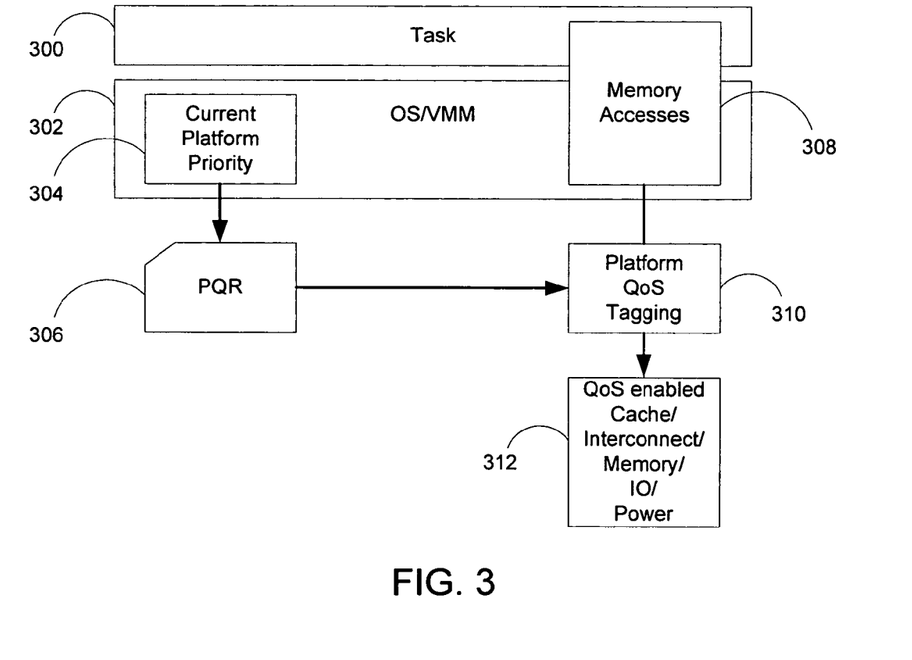
FIG. 3 describes a detailed version of one embodiment of the platform-level QoS mechanism on a platform that utilizes the PQR to set platform resource priority levels.

FIG. 3 describes a detailed version of one embodiment of the platform-level QoS mechanism on a platform that utilizes the PQR to set platform resource priority levels. In this embodiment, the PQR is set based on the platform priority needed for the currently running software. The task 300 interacts with the operating system or virtual machine manager (OS/VMM) 302 by informing the OS/VMM of its current platform priority 304. The OS/VMM 302 inputs this platform priority information into the PQR 306. Then, as the task runs, memory and IO accesses 308 requested from the OS/VMM 302 are then tagged 310 based on the value in PQR 306. These accesses are then treated accordingly by the QoS aware platform resources such as the cache, interconnect, memory, or I/O 312. Since the PQR is a customizable register that allows differentiation in prioritization amongst the different platform resources, this embodiment, for example, may enforce more space in cache or system memory, reserve bandwidth in the processor-memory interconnect, or give preferential treatment in I/O based on the QoS policies. In one embodiment, the PQR-based platform resource prioritization process is enabled by the OS/VMM. In this embodiment, the OS/VMM would have an Application Programming Interface (API) to allow software applications to access the PQR and the related platform resource prioritizations. Additionally, the OS/VMM would need to manage the relative platform resource priority levels among multiple processes and threads in the system.

Figure 4:
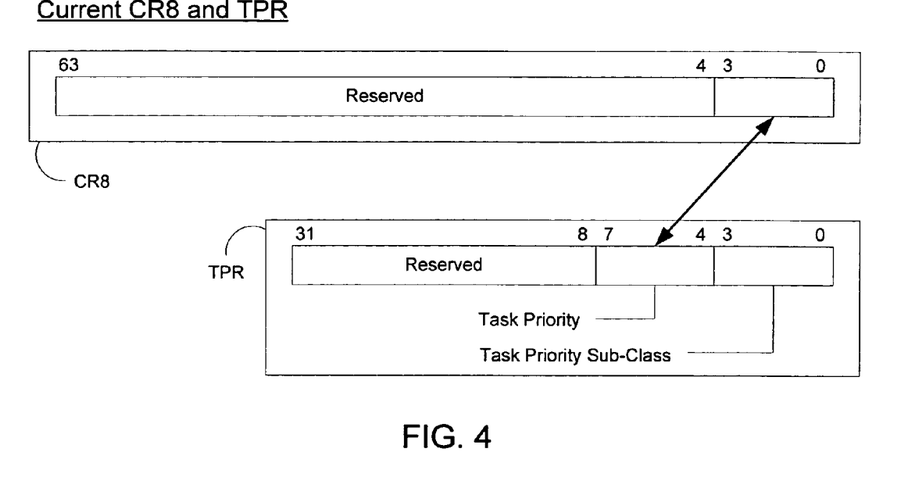
FIG. 4 illustrates one embodiment of the implementation of the existing TPR and CR8 utilized by the platform-level QoS mechanism in FIG. 2.

FIG. 4 illustrates one embodiment of the implementation of the existing TPR and CR8 utilized by the platform-level QoS mechanism in FIG. 2. In this embodiment, the TPR utilizes a task priority value in bit locations 7:4. Whereas in the CR8, the task priority value is in bit locations 3:0.

Figure 5:
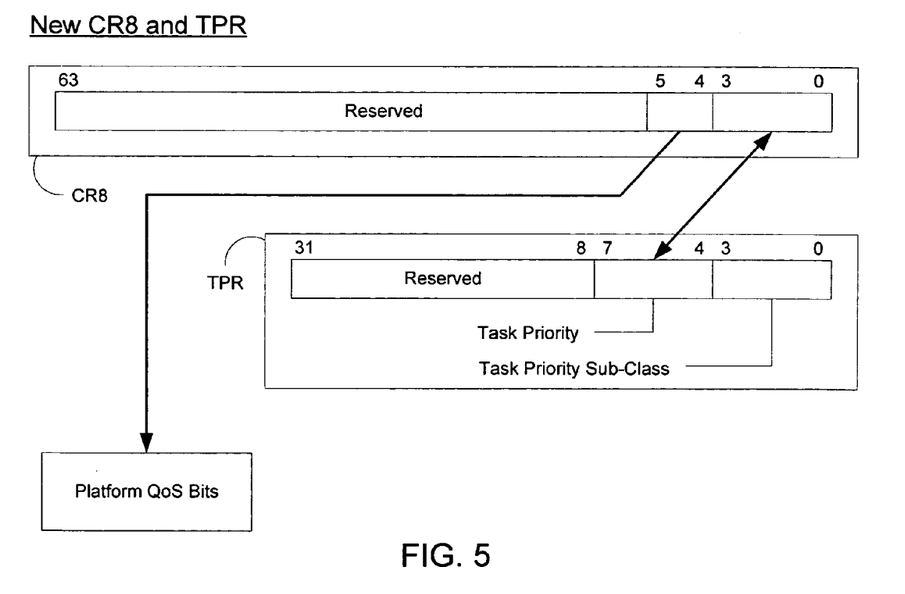
FIG. 5 illustrates one embodiment of the implementation of the CR8 utilized by the platform-level QoS mechanism in which the PQR is implemented in FIG. 3.

FIG. 5 illustrates one embodiment of the implementation of the CR8 utilized by the platform-level QoS mechanism in which the PQR is implemented in FIG. 3. In this embodiment, in addition to utilizing a task priority value in bit locations 3:0, CR8 has PQR bits in bit locations 5:4. In this particular embodiment, two bits of the CR8 are utilized to specify the cache priority level, which will allow four separate priority levels for the cache. For example, the two PQR bits may be 11, which indicates the highest priority, or 00, which indicates the lowest priority. In one embodiment, the different priority levels in the cache relate to the ability to access a specific percentage of the cache. For example, the highest priority level (priority 11) may allow access to 100% of the cache, the next highest priority level (10) may allow access to 50% of the cache, the next priority level (01) may allow access to 10% of the cache, and the lowest priority (00) may not allow access to the cache at all. In another embodiment, the CR8 may utilize additional bits to tag priority levels for other resources other than the cache (not shown).

Figure 6:
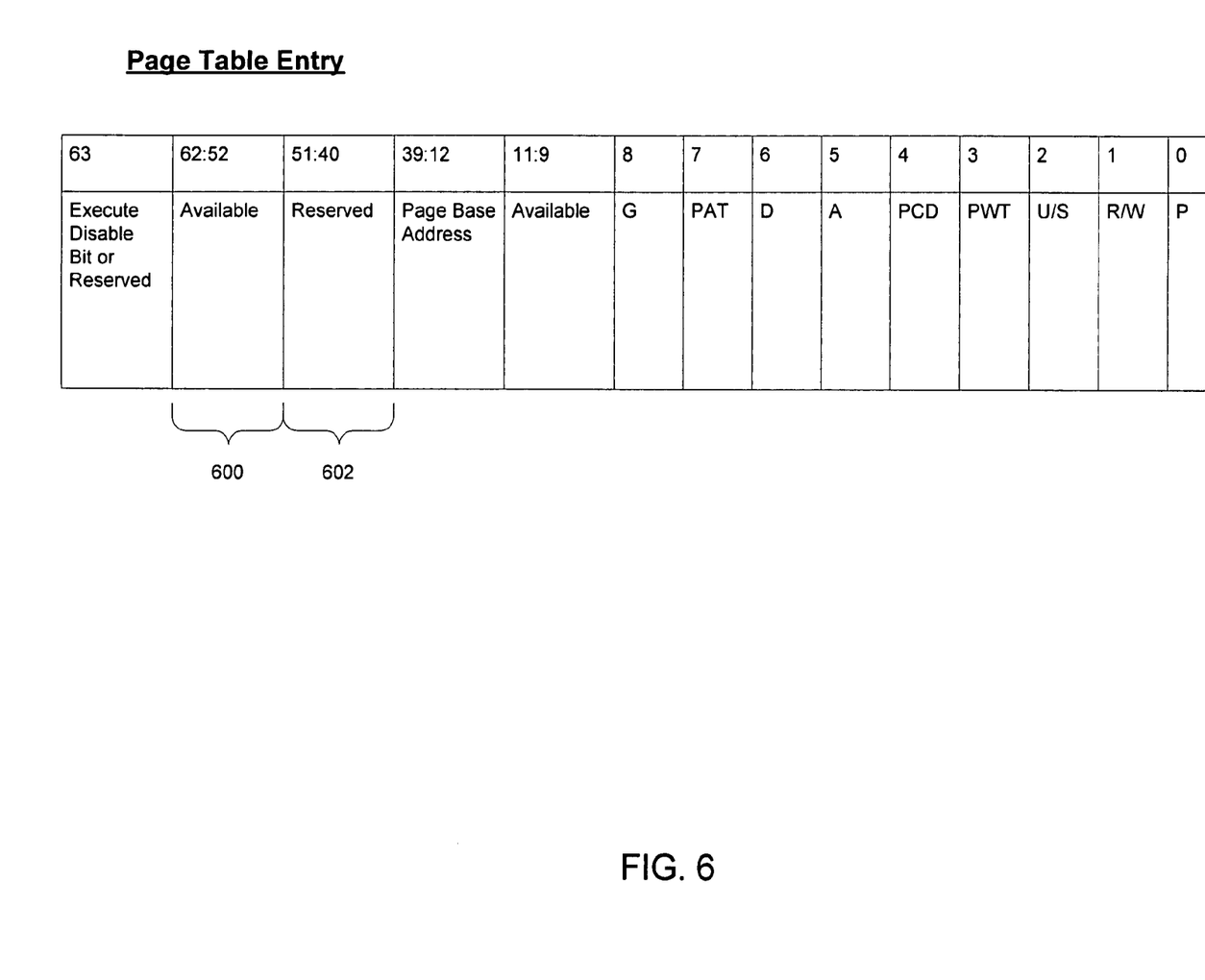
FIG. 6 describes one embodiment of a memory page table entry (PTE) format that utilizes available bits for a platform resource prioritization process.

FIG. 6 describes one embodiment of a memory page table entry (PTE) format that utilizes available bits for a platform resource prioritization process. In this embodiment, platform resource prioritization is accomplished by modifying certain properties in each memory PTE to associate the platform resources with that memory page. The PTE in FIG. 4 illustrates two separate locations within the current PTE format that are available for use as platform QoS bits.

In one embodiment, some of the software controlled bits (62:52) 600 can be used as platform QoS bits by providing a bit mask in another model specific register (MSR) or CR. In another embodiment, depending on the availability of the reserved bits (51:40) 602, some of those bits could be defined as platform QoS bits. The specific utilization of what QoS platform resources may be enabled or not as well as the prioritization granularity depends specifically on the number of bits that are capable of being utilized.

In one embodiment, when virtual memory is allocated in the computer system, the priority level of each memory page is assigned and added to the associated PTEs. The priority can be changed later through OS or VMM calls. The PTE information, including the platform resource priority bits, is loaded into the translation lookaside buffer. Subsequent accesses to the page get tagged with this platform priority information.

Figure 7:
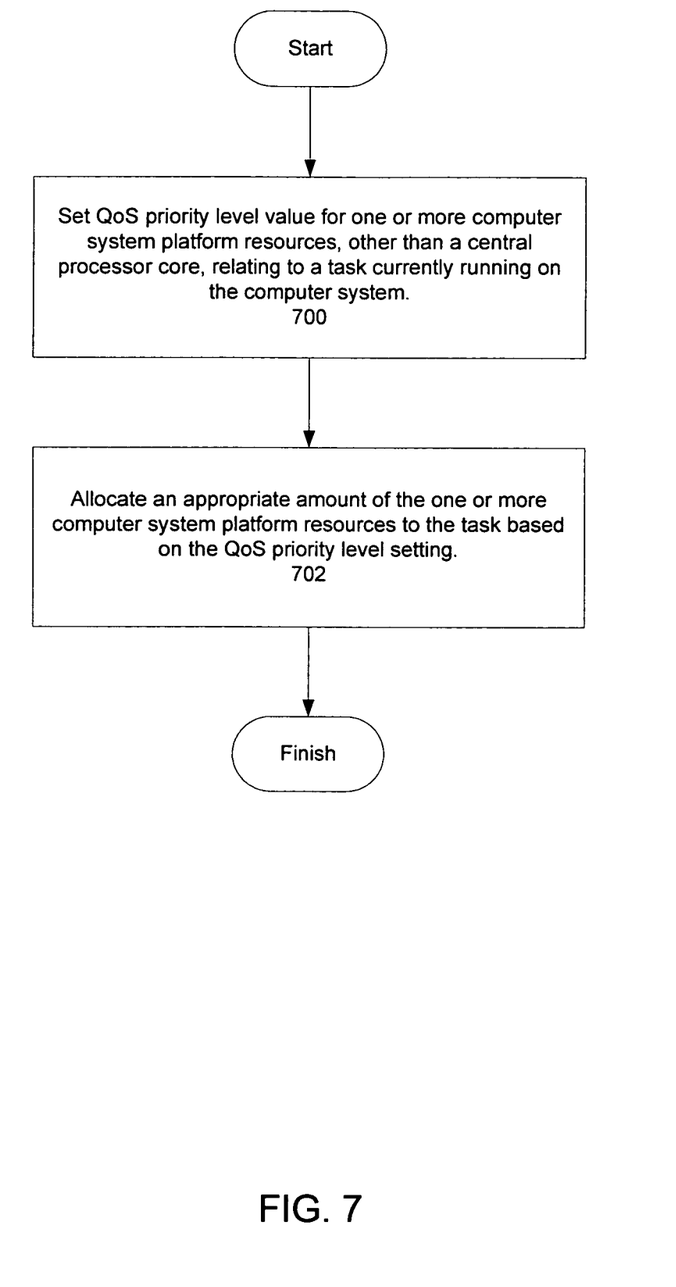
FIG. 7 is a flow diagram of one embodiment of a process to allocate computer platform resources based on QoS priority levels.

FIG. 7 is a flow diagram of one embodiment of a process to allocate computer platform resources based on QoS priority levels. The process is performed by processing logic that may comprise hardware (circuitry, dedicated logic, etc.), software (such as is run on a general purpose computer system or a dedicated machine), or a combination of both. Referring to FIG. 7, the process begins by processing logic setting a QoS priority level value for one or more computer system platform resources, other than a central processor core, relating to a task currently running on the computer system (processing block 700). In one embodiment, the platform resources include the central processor cache, the system memory, the processor-memory interconnect, and I/O. Then, processing logic determines whether the one or more computer system platform resources will be allocated to the task based on the QoS priority level setting (processing block 702) and the process is finished.

Figure 8:
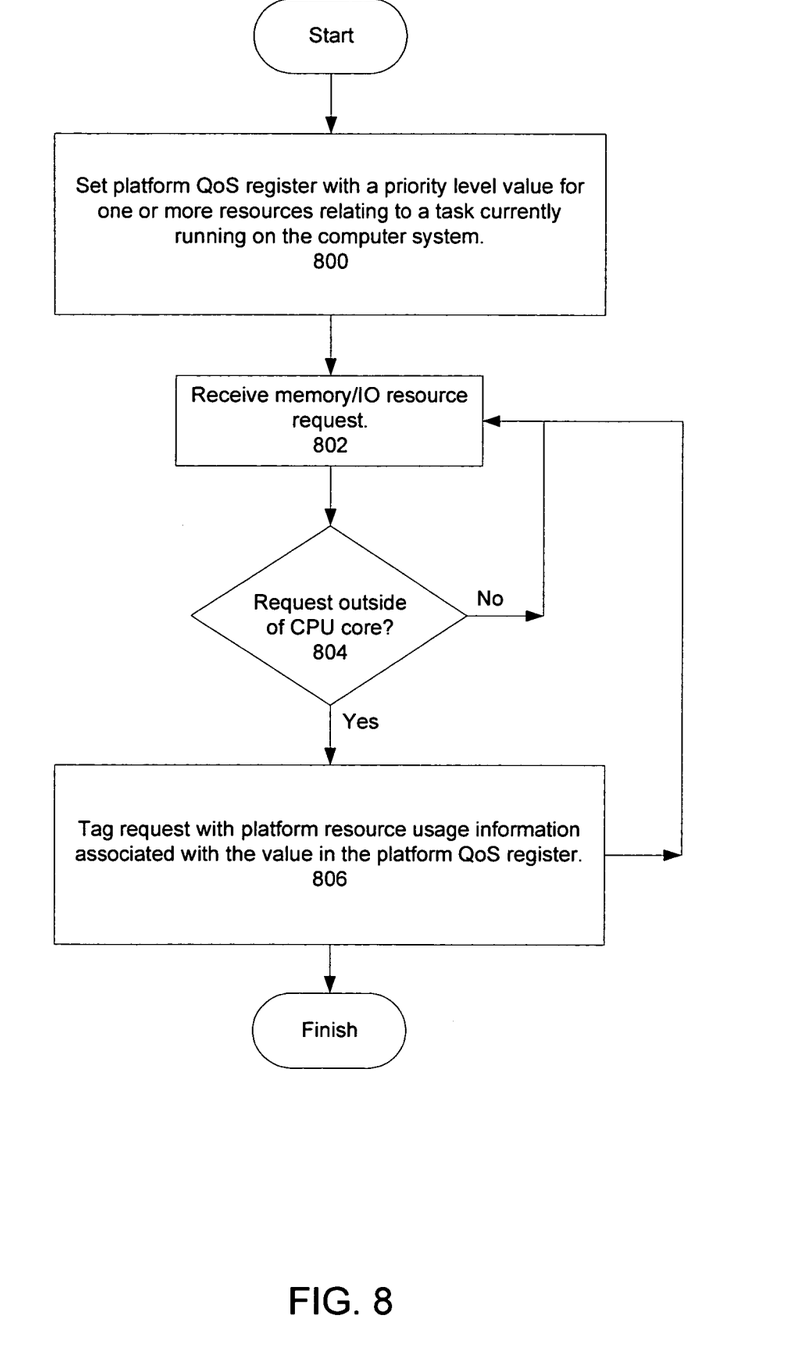
FIG. 8 is a flow diagram of an embodiment of a process to tag memory requests requiring access to platform resources outside of the processor core with QoS priority level values.

FIG. 8 is a flow diagram of an embodiment of a process to tag memory requests requiring access to platform resources outside of the processor core with QoS priority level values. The process is performed by processing logic that may comprise hardware (circuitry, dedicated logic, etc.), software (such as is run on a general purpose computer system or a dedicated machine), or a combination of both. Referring to FIG. 8, the process begins by processing logic setting a platform QoS register (PQR) with a priority level value for one or more resources relating to a task currently running on the computer system (processing block 800). Next, processing logic receives a memory/IO resource request (processing block 802). If the resource request is contained within the processor core then processing logic does not do anything regarding the resource request and returns to receive another memory/IO resource request (processing block 802). Otherwise, if the resource request requires accessing memory or I/O outside of the processor core then processing logic tags the request with platform resource usage information associated with the value in the PQR (processing block 806) and the process is finished. In one embodiment, the tagged memory/IO access is then processed by one or more QoS enabled platform resources, which utilize the tagged resource usage information to determine the priority level to apply to the memory/IO resource access.

Figure 9:
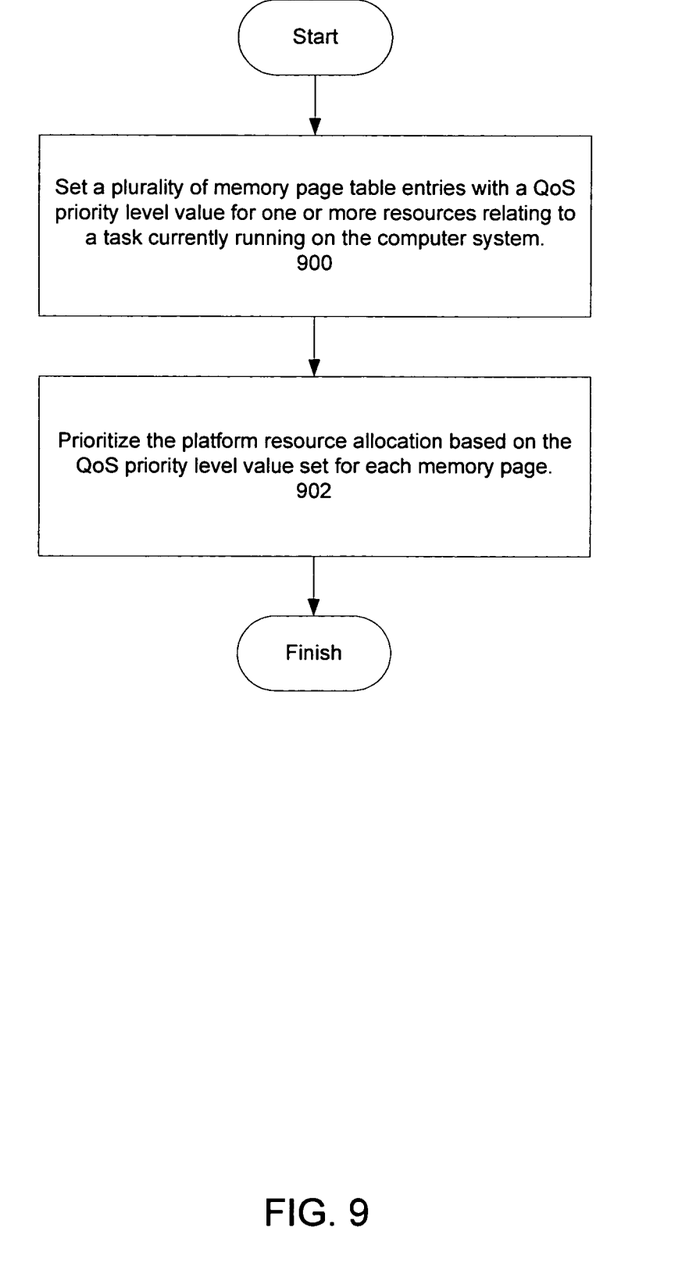
FIG. 9 is a flow diagram of an embodiment of a process to populate memory page table entries with platform resource QoS priority level values.

FIG. 9 is a flow diagram of an embodiment of a process to populate memory page table entries with platform resource QoS priority level values. The process is performed by processing logic that may comprise hardware (circuitry, dedicated logic, etc.), software (such as is run on a general purpose computer system or a dedicated machine), or a combination of both. Referring to FIG. 9, the process begins by processing logic setting a plurality of memory page table entries with a QoS priority level value for one or more resources relating to a task currently running on the computer system (processing block 900). In one embodiment, the process is performed when the system boots and virtual memory is allocated to a process. In one embodiment, the process is a software application. In another embodiment, the operating system or virtual machine manager sets the QoS priority level value in the page table entries later during regular system operation. Then, processing logic priorities the accessibility of memory locations based on the QoS priority level value set for each memory page (processing block 902) and the process is finished.

Thus, embodiments of a method, system, and computer readable medium to implement quality of service priority level controls for platform resources are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A device, comprising:
    at least one platform quality of service (QoS) register to store a QoS priority level value for each of a plurality of computer system platform resources, other than a central processor core, the QoS priority level value for each of the computer system platform resources comprising a priority level that a current task is granted for utilizing each of the computer system platform resources, wherein a first platform resource of the plurality of platform resources is granted a higher QoS priority level value than a second platform resource of the plurality of platform resources for the current task; and logic to determine whether each of the computer system platform resources will be allocated to the current task based on the QoS priority level value for each computer system platform resource.

2. The device of claim 1, wherein the computer system platform resources include at least one of the computer system's memory, input/output (I/O), interconnects, cache, and power delivery system.

3. The device of claim 2, further comprising:

tagging memory and I/O requests outside of the central processor core initiated by the current task with the QoS priority level value for the current task.

4. The device of claim 2, further comprising:

setting the processor core's task priority register with the QoS priority level value; and tagging memory requests outside of the central processor core initiated by the current task with the QoS priority level value for the current task with the value in the task priority register.

5. The device of claim 2, further comprising:

setting a plurality of memory page table entries with the QoS priority level value; and prioritizing the accessibility of memory locations based on the QoS priority level value set for each memory page.

6. The device of claim 5, wherein setting memory page table entries with the QoS priority level value is done during virtual memory allocation.

7. The device of claim 5, wherein setting memory page table entries with the QoS priority level value is done through an operating system call or virtual machine manager call.

8. A computer system, comprising:

a hardware apparatus within the computer system, including at least one platform quality of service (QoS) register to store a QoS priority level value separately for each of a plurality of computer system platform resources, other than a central processor core, the QoS priority level value for each of the computer system platform resources comprising a priority level that a current task is granted for utilizing each of the computer system platform resources, wherein a first platform resource of the plurality of platform resources is granted a higher QoS priority level value than a second platform resource of the plurality of platform resources for the current task; and at least one quality of service (QoS)-enabled computer system platform resource of the plurality of computer system platform resources, other than the central processor core, wherein the QoS-enabled computer system platform resource is operable to receive a QoS-tagged request from the current task; and determine whether to service the requests based on the QoS priority level value.

* * * * *